Aug. 25, 1964  H. RENNER ETAL  3,146,122
PROCESS FOR COATING OBJECTS IN A FLOW COATER
Filed April 18, 1960
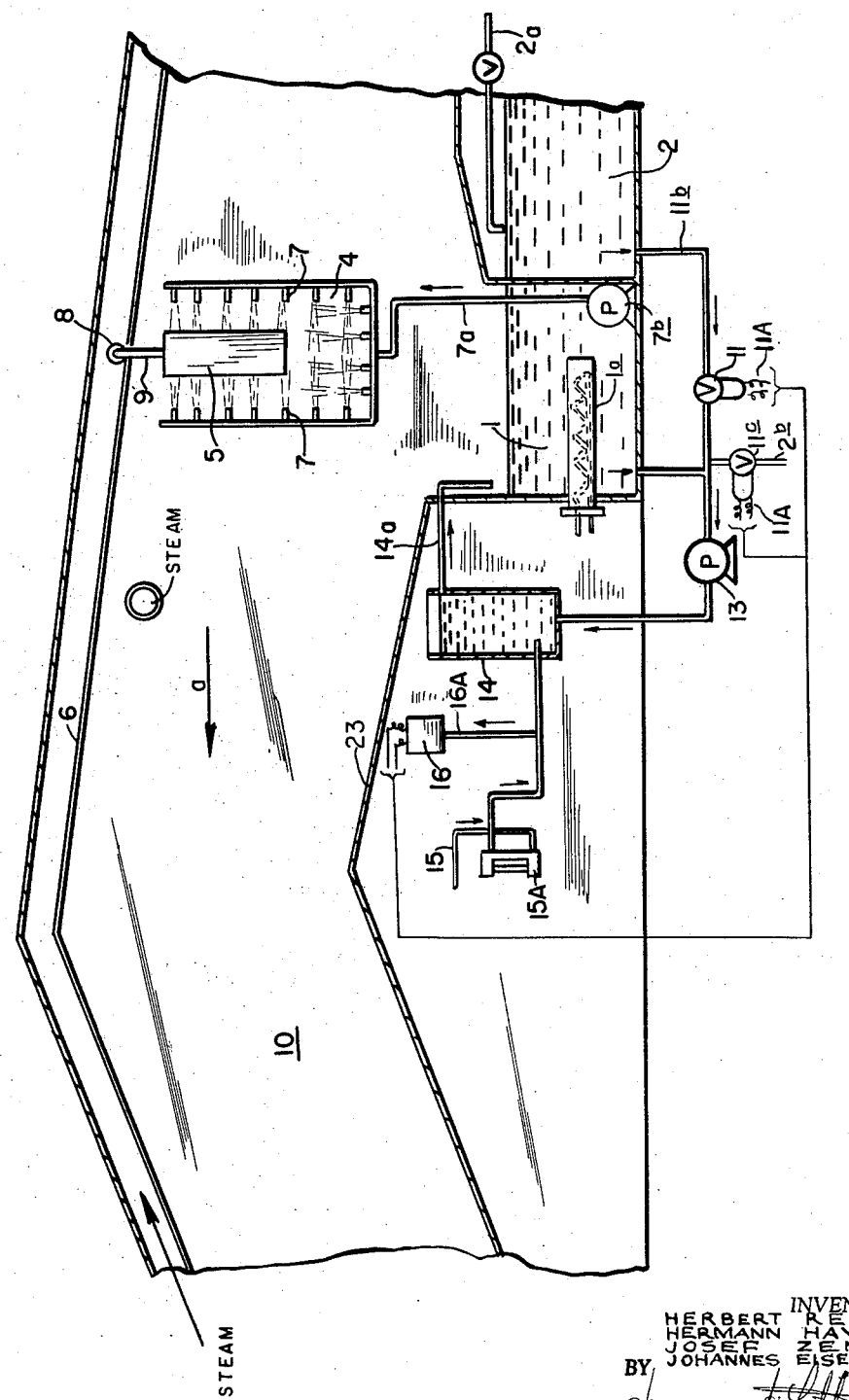
INVENTORS
HERBERT RENNER
HERMANN HAYEK
JOSEF ZEMANN
JOHANNES EISENWIENER
BY
ATTORNEYS

United States Patent Office 3,146,122
Patented Aug. 25, 1964

3,146,122
PROCESS FOR COATING OBJECTS IN A FLOW COATER
Herbert Renner, Hermann Hayek, Josef Zemann, and Johannes Eisenwiener, all of Guntramsdorf, near Vienna, Austria, assignors to Peter Stoll, a corporation of Austria
Filed Apr. 18, 1960, Ser. No. 23,019
16 Claims. (Cl. 117—102)

The present invention relates to the use of water-soluble and water-dispersible coating agents as well as of combinations of these two, in fact to all water-dilutable coating agents, for coating articles in a flow-coater.

The flow-coater process is known in the art per se (see, for example, Industrie-Lackier-Betrieb, 26th year, pages 320 ff., 1958). However, water-dilutable coating agents, such as cements, base coats, single-coat lacquers, intermediate and covering lacquers have previously not been used in the flow-coater process for various reasons. For example, previously, so-called curtains and tears were formed and the coated objects had such uneven surfaces that they were not very well suitable for further use, especially for applying lacquer covers thereto. Other problems encountered were foam formation, poor stability of the water-diluted coating agents over long periods of operation, such as sedimentation of the binder; tendency toward crater formation on the lacquered objects; the uncertainty whether the water vapor produced in the drain tunnel of the flow-coater would behave as favorably as the solvent atmosphere which is developed in the drain tunnel upon evaporation of the organic solvents in conventional lacquers; difficulty in maintaining the solids content of the water-diluted coating agents constant in the flow-coater because large amounts of "dilution water" had to be added in large scale operation, whereby a reduction of the solids content in the coating agent necessarily occurred; reduction of the organic solvent content in the coating agent system because evaporation takes place, especially when low-boiling-point organic solvents were used and many more.

All of these disadvantages occurred when the flow-coater was operated over long periods of time with the same, relatively large amount of coating agent. That is when, because of the relatively small rate of the number of objects fed into the flow-coater, the consumption of coating agent was small compared to the amount of coating agent supplied to the flow-coater.

An object of our invention is therefore to provide a process for applying a uniform coat of a water dilutable coating agent to an article in a flow-coater, wherein the coat is free from surface defects.

Further objects of our invention are to overcome the problems enumerated above in the use of water dilutable coatings in a flow-coater.

These and other objects of our invention will become apparent as the description thereof proceeds.

We have found that the above difficulties may be overcome by the use of our invention. The invention resides in the discovery that coating agents which are dilutable or soluble in water or dispersible with water can be successfully employed in the flow-coater when the ratio of binder to solvent to water in the lacquer being sprayed in the flow-coater is maintained practically the same during the entire work procedure and the viscosity as well as the solids content of the coating agent is maintained constant or as constant as possible at the same time.

The maintenance of the ratio of binder to solvent to water may be accomplished by adding to the coating agent during the work process water as well as solvent which affects or increases the water-solubility of the resin component of the coating agent, in accordance with the amount of water or solvent loss due to the evaporation in the spray chamber.

Advantageously, the coating agent is heated to a temperature above that which prevails in the flow-coater prior to introduction into the spray chamber, for example to about 40° C.

The amount of solvent in the mixture to be added varies in accordance with the degree of volatility (evaporation coefficient) of the solvent being used or of the solvent which is already present in the coating agent, and it may vary within wide limits, preferably in the order of magnitude of about 50% weight in relation to the weight of the mixture. If a solvent with a very low volatility (high evaporation coefficient) is used, the amount of solvent in the mixture to be added may be maintained very low and may even drop to 0. In the event that a difficultly vaporizable solvent is used, or if there is no organic solvent in the coating agent at all, water alone may be added in accordance with the degree of water loss.

Flow-coaters which are used in industry often include two separate containers, one of which serves as a storage container for the lacquer and the other as a storage container for the diluent. Depending upon the solvent content of the lacquer, diluent is added thereto, mostly discontinuously. While we make use of the term "lacquer" in this and subsequent paragraphs, we would like it understood that the process applies to any coating agent which is water dilutable, i.e., water soluble or water dispersible.

In order to prevent a possible break down of the water-solvent mixture in the dilution vat and to exclude a source of contamination, we have found as an additional embodiment of our invention, that the vat of the flow-coater apparatus which is used for the production or storage of the dilution agent is advantageously replaced by a direct feedline for the water, for example from a water-softening device. The desired amount of solvent is fed into the water feedline with the aid of a dosing device, preferably a self-operated dosing device. Most advantageously, the feed rate of the water is controlled by an automatic device, which functions depending upon the viscosity of the lacquer. This dosing of the solvent added to the dilution agent is controlled as a function of the amount of water flowing through the water feedline.

In accordance with our present invention, therefore, the quantitative ratio of binder to solvent to water must be maintained substantially constant, within technical tolerances, during the entire work procedure.

A specific value, in the present case a quantitative ratio, may essentially be maintained approximately constant by various methods in a process in which this value may vary as a function of time and throughput by continuous or discontinuous adjustment of the changing factors which make up the value to be maintained constant. This may be accomplished by measuring the duration of the process in such a way that the value to be maintained changes only very little during the procedure, that is within technically tolerable limits. In other words, the quantities of coating agents are selected so that after a certain period of time they drop below a minimum amount required for flow-coating, for example after a certain number of passages of coating agent through the flow-coater apparatus while a certain percentage of coating agent is applied to the objects to be lacquered and a certain amount of water and solvent are lost, and so that only then the quantitative ratio for the achievement of satisfactory lacquer coating drops below or exceeds the required value.

Thus the "substantial" maintenance of a constant ratio of binder to solvent to water must be such that the through-put rate as well as the quality of the finished lacquer coating always satisfies the particular requirements.

In accordance with experience, this is the case when the tolerance of the starting concentration does not exceed ±50 relative percentage, based upon the particular starting concentration both for the solvent component as well as for the water.

For example, if the starting concentration of the solvent is 30% based upon the total lacquer mixture, a maximum variation of the solvent concentration of 15 to 45%, based upon the total lacquer concentration, is tolerable during the coating process. If the starting concentration of water is 60 percent, based upon the total lacquer composition, the tolerable variation in the water concentration during the coating process is 30 to 90%, based upon the total lacquer composition.

The required technically practical maintenance of the ratio of binder to solvent to water in the flow-coater may also be achieved, for example by introducing the solvent-water mixtures or water alone into the container provided in the flow-coater for storing the diluent, and adding these mixtures or water alone to the coating agent, which is in a separate container, through an automatic regulator valve in a corresponding quantitative ratio, that is, so that the conditions according to the invention are fulfilled. The addition of water and solvent may also be accomplished by feeding them directly, and each component separately, into the coating agent or into the storage vat in which the coating agent is located. The addition of these additives in accordance with the invention makes it possible to avoid the disadvantages which are otherwise caused by the evaporation losses which occur in the flow-coater. Particularly, homogenousness of the coating agent and excellent stability thereof as well as uniform viscosity of the coating agent are achieved thereby, so that difficulties in application due to running are avoided and a uniform coating thickness is assured.

Under these circumstances, the coating itself is much smoother and more free from pores, so that the cover coating which may be applied to the coating produced in the flow-coater, and which may also be applied thereto in the flow-coater, turns out completely satisfactorily and does not lose any sheen and body and does not cave. The necessity for polishing coatings applied in the flow-coater in this manner is practically eliminated.

The corrosion protection is also substantially improved by the addition according to the invention, because the finished coating is much more pore-free.

The following materials may be used for the production of the water-soluble or water-dispersible coating agents in accordance with the invention: organic and inorganic pigments, cutting agents, such as rutile, anatase, lithopone, blanc fix, kaolin, heavy spar, zinc sulfide, carbon black, iron oxide dye, zinc chromate, lead cyanamide, heliogen-blue, as well as soluble dyes, such as varnish dye, in a ratio of pigment or dye to solid resin of 0 to 5.0:1.

The following materials may also be used as binders: water-soluble or water-dispersible synthetic resins and natural resins as well as combinations thereof, water-soluble or water-dispersible vegetable or animal oils and fats and their transformation products, such as linseed oil and sardine oil, dehydrogenated castor oil, water-soluble or water-dispersible natural resins and their transformation products, such as shellac, resins, soaps and resin esters; water-soluble or water-dispersible synthetic resins modified with natural resins, water-soluble or water-dispersible maleinate resin; water-soluble or water-dispersible saturated and unsaturated polyesters; water-soluble or water-dispersible oil-free and styrenized alkyd resins; water-soluble or water-dispersible alkyd resins with synthetic fatty acids; water-soluble or water-dispersible alkyd resins with vegetable and animal fatty acids; water-soluble or water-dispersible acrylic alkyd resins; water-soluble or water-dispersible silicone alkyd resins; water-soluble or water-dispersible phenol resins and novolaks; water-soluble or water-dispersible butanolized resol resins modified with fatty acids or by incorporation of polyesters; water-soluble or water-dispersible resols and cold-hardening phenol resins; water-soluble or water-dispersible alkyl phenol resins; water-soluble or water-dispersible terpene-phenol resins; water-soluble or water-dispersible plasticized or unplasticized urea resins; water-soluble or water-dispersible melamine resins; water-soluble or water-dispersible polyvinyl acetals; water-soluble or water-dispersible polyvinyl chlorides and polyvinyl chloride mixed polymerizates; water-soluble or water-dispersible polyvinyl acetates and other polyvinyl esters; water-soluble or water-dispersible polyvinyl ethers; water-soluble or water-dispersible polyvinyl carbazoles; water-soluble or water-dispersible polyacrylic resins and resins of polyacrylic acid derivatives, such as water-soluble or water-dispersible polymethacrylic acids; water-soluble or water-dispersible polystyrenes; water-soluble or water-dispersible polyethylenes; water-soluble or water-dispersible polyisobutylenes; water-soluble or water-dispersible cumerone and indene resins; water-soluble or water-dispersible ketone and aldehyde resins; water-soluble or water-dispersible aromatic derivatives of formaldehyde resins; water-soluble or water-dispersible anilin resins; water-soluble or water-dispersible carbamic acid resins; water-soluble or water-dispersible sulfonamide resins; water-soluble or water-dispersible chlorodiphenyl resins; water-soluble or water-dispersible polyamide resins; water-soluble or water-dispersible poly-addition resins such as polyurethane; water-soluble or water-dispersible epoxide resins and their transformation products; water-soluble or water-dispersible nitro-cellulose resins as well as other water-soluble or water-dispersible cellulose resins; water-soluble or water-dispersible natural and synthetic rubber resins and their derivatives such as butadiene derivatives; water-soluble or water-dispersible silicone resins; water-soluble or water-dispersible resins of halogenated polyethylene; and water-soluble or water-dispersible polycarbonates.

Instead of all of the above indicated natural or synthetic resins, their water-soluble or water-dispersible soaps or other derivatives may also be used as binders.

Suitable organic solvents which may be added are: aliphatic and aromatic hydrocarbons, such as gasoline or xylene; esters such as butoxyl; ketones and ketone alcohols, such as methylethylketone and diacetone alcohol; chlorinated hydrocarbons such as carbon tetrachloride and monochlorobenzene; glycols and polyglycols such as ethylene glycol and tetraethylene glycol, as well as ethers and esters such as propyl glycol and glycol monoacetate or other glycol compounds, such as dioxane and glycolic acid butylester; ethers and acetals such as methylglycerin ether and dimethylacetal; aliphatic and aromatic alcohols such as butanol and phenol; all of these in a ratio of 0 to 50% by weight of the total weight of the lacquer. Also, water in a ratio of 0.05 to 10:1 in relation to the solid resin.

Furthermore, all other necessary additives for achieving the process may be added, such as foam breakers, emulsifiers, stabilizers, antisedimentation agents, film prevention agents, preservatives and pH regulators such as silicone oils, fatty alcohol sulfonates, tylose, sodium hexameta-phosphate, bentones, dipentene, chlorophenols, ammonia or organic amines.

Preferred solvents which are used as additives for the coating agents in admixture with water according to the present invention are those which have an evaporation coefficient of at least 8 (based on ethylether=1) and at least two carbon atoms in the molecule. The evaporation coefficient is a figure which indicates how rapidly a liquid evaporates under certain test conditions based on the rate of evaporation of ethyl ether equal to 1. The following are examples of possible combinations.

|                                                     | Parts by weight |
|-----------------------------------------------------|-----------------|
| Anatase                                             | 13.00           |
| Water-soluble plasticized phenol resin              | 67.00           |
| Water                                               | 3.00            |
| Ethylene-glycol                                     | 17.00           |
| Rutile                                              | 30.00           |
| Blanc fix                                           | 7.5             |
| Light carbon black                                  | 0.5             |
| Water-soluble plasticized phenol resins             | 37.00           |
| Gasoline                                            | 1.00            |
| Methylethylketone                                   | 1.00            |
| Diethylene-glycol-monoethylether                    | 4.00            |
| Water                                               | 19.00           |
| Lithopone                                           | 16.00           |
| Chalk                                               | 10.00           |
| Water-soluble plasticized phenol resin              | 50.00           |
| Water                                               | 15.00           |
| Ethanol                                             | 1.5             |
| Benzyl-alcohol                                      | 7.5             |
| Oxide red                                           | 25.00           |
| Kaolin                                              | 2.00            |
| Heavy spar                                          | 12.00           |
| Water-soluble plasticized melamine resin            | 33.00           |
| Xylene                                              | 0.5             |
| Diacetone alcohol                                   | 1.00            |
| Butyl glycol                                        | 3.5             |
| Water                                               | 23.00           |
| Zinc sulfide                                        | 39.00           |
| Oxide yellow                                        | 3.5             |
| Oxide red                                           | 1.5             |
| Water-soluble plasticized urea resins               | 25.00           |
| Methyl hexaline                                     | 3.5             |
| Isopropanol                                         | 3.5             |
| Water                                               | 26.00           |
| Zinc sulfide                                        | 18.00           |
| Blanc fix                                           | 30.00           |
| Water-soluble plasticized phenol resin              | 12.00           |
| Methylhexaline                                      | 2.00            |
| Butyl-diglycol                                      | 2.5             |
| Water                                               | 37.5            |
| Rutile                                              | 31.00           |
| Chalk                                               | 31.00           |
| Water-soluble acrylic resin                         | 15.00           |
| Propanol                                            | 1.00            |
| Water                                               | 22.00           |
| Zapon True Varnish Red 3B (a copper phthalocyanine dyestuff) | 0.5    |
| Water-soluble plasticized melamine resin            | 16.00           |
| Ethyl glycol                                        | 3.5             |
| Water                                               | 80.00           |
| Blanc fix                                           | 53.00           |
| Oxide black                                         | 23.00           |
| Water-soluble plasticized phenol resin              | 15.00           |
| Dibutyl-glycol                                      | 6.00            |
| Water                                               | 3.00            |
| Rutile                                              | 13.00           |
| Lithopone                                           | 26.00           |
| Water-soluble plasticized phenol resin              | 26.00           |
| Butyl-Carbitol                                      | 30.00           |
| Water                                               | 5.00            |
| Zinc sulfide                                        | 28.00           |
| Blanc fix                                           | 9.5             |
| Water-soluble plasticized phenol resin              | 19.00           |
| Methyl-hexalin                                      | 3.00            |
| Butyl-diglycol                                      | 3.00            |
| Water                                               | 37.5            |
| Zinc sulfide                                        | 15.00           |
| Blanc fix                                           | 30.00           |
| Water-soluble plasticized phenol resin              | 10.00           |
| Methyl-hexalin                                      | 1.5             |
| Butyl-diglycol                                      | 2.00            |
| Water                                               | 41.5            |
| Rutile                                              | 11.00           |
| Heliogen-blue (a copper phthalocyanine dyestuff)    | 2.5             |
| Water-soluble acrylic resin                         | 45.00           |
| Water                                               | 41.5            |
| Rutile                                              | 3.5             |
| Heliogen-green (a copper phthalocyanine dyestuff)   | 1.00            |
| Water-soluble plasticized melamine resin            | 43.00           |
| Butoxyl                                             | 26.00           |
| Methyl-glycerin ether                               | 0.5             |
| Monochloro-benzol                                   | 0.5             |
| Propyl-glycol                                       | 23.00           |
| Water                                               | 2.5             |
| Rutile                                              | 11.00           |
| Lithopone                                           | 21.5            |
| Water-soluble plasticized phenol resin              | 21.5            |
| Butyl-glycol                                        | 42.00           |
| Water                                               | 4.00            |
| Rutile                                              | 15.00           |
| Lithopone                                           | 29.00           |
| Water-soluble plasticized phenol resin              | 29.00           |
| Isopropanol                                         | 21.00           |
| Water                                               | 6.00            |
| Lithopone                                           | 9.00            |
| Rutile                                              | 5.00            |
| Kaolin                                              | 19.00           |
| Polyvinyl-acetate dispersion, 50%                   | 38.00           |
| Water                                               | 24.00           |
| 1% tylose solution (methyl-cellulose)               | 5.00            |

Referring to the drawing which illustrates a preferred embodiment for carrying out our invention, The drawing, schematically, illustrates a flow-coating apparatus in elevation cross-section, showing spraying and drying sections.

In the schematic representation of the flow-coater, 1 is a container for the coating agent, 2 is the container for the additive composition and 11 is the automatically controlled valve, for example controlled by a manostatic pressure regulator 16 or by a controlled viscosity measuring device which is not shown, by means of which the additive composition in container 2 for maintaining uniform viscosity as discussed above, is added to the coating composition in container 1 during the entire operation. The container 2 may be filled with water or water and a solvent from line 2a or separate water and solvent lines may connect to line 11b leading to electrovalve 11. A solution pre-heater is shown at 1a. 4 is a spray chamber with nozzles 7, in which the object 5 to be coated, is introduced into the spray chamber by means of a transport device 9, preferably a chain attached to a roller 8 or other sliding device which glides over a rail 6, is treated with the coating composition and is transported into the tunnel-like chamber 10 (called drain-tunnel) in the direction of arrow "a." In this chamber the excess coating composition drips from the treated objects, whereas the coating layer adhering to the objects dries. The drying can be regulated by drawing air through the drain tunnel. The excess of coating composition introduced into the spray chamber as well as the coating composition dripping from the objects in chamber 10 falls onto drain surfaces 23 and runs back into container 1, so that the coating composition is constantly cycled. The coating composition is cycled from tank 1 to nozzles 7 by a pump 7b which pumps the coating composition through the conduit 7a to the nozzles 7. The apparatus shown is mainly diagrammatic to illustrate the various necessary elements and their functions. It will be understood that the solvent composition tank could be located differently and that other modifications are possible.

The constant maintenance of the ratio of binder to solvent to water may also be accomplished by measuring the concentration of solvent and water separately by chemical and physical methods in the coating agent, either continuously or discontinuously after suitable periods of time. For this purpose a number of methods are known in the art such as the determination of the dielectric constant, the electrical conductivity, the loss factor, polarographic, spectrographic, electrolytic, potentiometric methods, inoculation with radio-active isotopes, measurement of the breaking index, colorimetric methods, specific adsorption, analytical gas determination methods in combination with electrolytic methods and/or evaporation devices, the last two methods also individually, as well as determination of the density are particularly suitable. All of these methods may, if desired, also be carried out after filtration of the pigment component.

The addition of the required amount of water or solvent may be accomplished semi-automatically by hand regulation of a dosing device for the separate feed of the water or solvent component into the vat in which the coating agent is located, depending upon the indications of the analytical apparatus.

The addition may also be accomplished by the closing of an auxiliary electric circuit as soon as a certain minimum value is reached which can be adjusted on the analytical apparatus, which activates a pump system or another dosing device which feeds water or solvent into the coating agent until the normal concentration conditions are reestablished and the auxiliary circuit is, therefore, interrupted. The adjustment of the maximum value may be accomplished, for example with the aid of scale instruments by means of electrically-conductive insulated contacts or pegs on the scale, so that when the indicator, made of electrically-conductive material, touches the contacts the auxiliary electric circuit is closed. In instruments with light beam indicators, such as in polarographs with a light beam indicator galvanometer, it is advantageous to use a photoelectric cell which is arranged in such a way that the beam of light strikes it when a certain angle of the light beam indicator is exceeded. The current which is thus caused to flow in the auxiliary circuit then activates the feed or dosing device after possibily amplifying the current, etc. Pneumatic or other types of transfer devices may also be used. The storage vat for the coating agent may also include a stirring device or an additional cycling pump which provides for a thorough admixing of the added components with the coating agent; such a device may also advantageously be provided when a premixed mixture of water and solvent is fed into the coating agent, as described below.

The addition of the diluent for the coating composition may also be accomplished by premixing water and solvent in a separate storage vat or the like and then adding this mixture through a single dosing device to a coating composition. However, the mixing ratio must be such that the losses of water and solvent which occur through evaporation during the application of the coating composition, for example are equalized, that is, that a substantially constant maintenance of the ratio of binder to water to solvent is assured. The required adjustment of the water and solvent ratio may be accomplished on the basis of Raoult's law.

Of course, in general, and particularly in the case of special conditions, experimentally determined vapor pressure diagrams or the corresponding tables which give the partial vapor pressures and the total vapor pressure as a function of the mixture ratio for the corresponding water-solvent system may be used for the calculation of the mixture ratio. From these diagrams it is then possible to adjust the solvent-water mixture in accordance with the relative component of the partial vapor pressure of the mixture components. In this method the ratio used should be that ratio which applies to the mixture ratio which was originally present in the coating composition.

In place of the vapor pressure values, empirically-determined evaporation values may also be used, preferably in those cases where the vapor pressures are not known or in those cases where there is substantial deviation from Raoult's law. In place of evaporation values, other characteristic values which are proportional to the volatility of the water and of the solvent may also be used. Examples of various evaporation values are the following: the dish method, the pipette method, the method of Kantorowicz and Kaisermann, and the American standard method.

If a premixed solution of water and solvent is used for maintaining the ratio of binder to water to solvent constant, it suffices to use a physical or chemical characteristic value of the coating composition which depends upon the concentration to determine the amount of required dilution agent to be added for replacing the losses. The control of this characteristic value may be continuous or, as described above, discontinuous at short intervals of time. Characteristic values which may be used for this purpose are: Measurement of the density, viscosity, the conductivity, the dielectric constant, the loss factor, the specific heat, the surface tension, as well as colorimetric, polarographic, electro-analytic, potentiometric, spectrographic and volumetric gas methods, the latter also in combination with electro-analytic and/or evaporation methods; the last two methods may also be used individually. Other values include the measurement of the breaking index, the measurement of radioactivity after inoculation with radioactive isotopes, adsorption methods. All of these methods may also be applied after removal of the pigment component from the coating composition, for example by filtration.

The addition of the premixed diluting solution may be accomplished as previously described for the individual components either semi-automatically, that is by hand regulation of a dosing or feed device, in accordance with the indications of an analytic apparatus operating in accordance with the above principles. The premixed diluting solution is allowed to flow into the coating composition until the desired normal value of the concentration is reestablished, or it may be accomplished completely automatically, as illustrated in the drawing.

In the embodiment illustrated, the lacquer mixture is continuously cycled by a pump 13 from a container 1 through an overflow container 14, so that the overflow container constantly contains an average sample of the lacquer. Any desired, but small amount of air is introduced from a pressure line 15 through a rotameter 15A (for measuring small amounts of air) and through a submerged tube into the cylinder 14. The pressure in the air line will, therefore, always correspond to the weight of liquid in the cylinder 14 when the air just bubbles out of the line. Since the height of the liquid column is maintained constant by the overflow, the measured weight is thus proportional to the specific weight. By increasing the height of the overflow container, the pressure differential and thus the accuracy of the measurement can be increased as desired. A manostatic pressure regulator 16, of the type described for example in German Patent Number 1,077,462, is connected to the air line 16A which gives off an electrical impulse to the electro valve 11 connected by electrical conductors 11A, when the pressure and, therefore, the specific weight changes. When the specific weight increases, the manostatic pressure regulator responds because of the increase in the pressure of the bubbling air and the electro valve 11 is, therefore, opened, whereby diluting solution flows into the container 1 from a diluting compartment, such as 2, until the specific weight has reached the proper value. In the specific embodiment illustrated, the diluting solution flows from compartment 2 through the line 11b, electrovalve 11 and pump 13 to the container 14, and thence into the container 1. Between the electrovalve 11 and pump 13, it is mixed with outflowing lacquer solution from container 1. It will be obvious to persons skilled in the art, that two electrovalves 11, controlled from regulator 16, may be provided, one for controlling the flow of water into the intake of pump 13 and the other controlling the flow of solvent into the intake of pump 13, as illustrated by solvent line 2b and electrovalve 11c. The valves 11 and 11c may be proportioned to feed any desired ratio of water to solvent to binder mixture in container 1. When operating conditions make it unnecessary to use both electrovalves 11 and 11c, one of these valves may be disconnected. This opening and closing regulating means 11 may, of course, be fashioned in a proportional regulating device in accordance with known methods in the liquid-flow-regulating art. Pressure regulators operating on the principle described for regulator 16 are well known and may be purchased, for example, from Messrs. J. C. Eckardt A.G., Stuttgart-Bad-Cannstadt, Germany. They are described in German Patent No. 1,077,462. The coating mixture in container 1, thus regulated as to its composition, is pumped, by a pump 7b through the conduit 7a to the nozzles 7.

As an additional example of a fully automatic means for regulating the concentration ratios, a device may be used which is based upon the measurement of the viscosity of the coating composition.

The new process is, for example, particularly suitable for coating construction and machine parts of all types made of metals and their alloys, plastics, wood, ceramic material, natural stone, glass, such as automobile parts, automobile body parts, refrigerator and washing machine parts, plates, tubes, angle irons, and construction elements composed thereof, packages such as cannisters and barrels, heater components such as radiator housings, transformer plates and other construction components in electric machine structures, in fact, for generally the entire field of industrial baked enamels.

The process of our invention making use of water-dilutable, water-soluble, or water-dispersible coating agents, especially lacquers, and substantially maintaining the quantitative ratio of binder to solvent to water during the entire coating procedure, whereby the viscosity as well as the solids content of the coating composition are maintained constant or, within technical tolerances, as constant as possible, can be amplified by additionally introducing a small amount of an organic solvent, especially a solvent having a high boiling point, in the vapor or finely dispersed, liquid state, possibly together with or simultaneously with steam, or steam alone, preferably in the first half of the drain tunnel after the spray chamber of a flow-coater, whereby it is possible to achieve further improvement of the distribution of the coating composition as well as to avoid the formation of drops or the disadvantages caused by the running of the coating film on the coated objects.

In order to accomplish this additional step of our invention one or several apertures are provided in the side walls of the drain tunnel through which the solvent vapor or finely dispersed liquid solvent and possibly the steam, or steam alone, are introduced. In place of, or in addition to the side apertures, a vaporization vessel may be also provided in the floor of the drain tunnel in which the organic solvent to be used and possibly water, or water alone, are vaporized.

A control of the amount of vaporous medium to be introduced or already introduced may, if necessary, be effected by continuous or intermittent sampling of the air from the drain tunnel.

Examples of suitable organic solvents which may be used in the process according to the present variation of the invention are high boiling point hydrocarbons, such as tetra-, hexa-, or decahydronaphthalene, petroleum hydrocarbons as well as aliphatic alcohols, such as ethyl, propyl, hexyl, octyl, nonyl alcohol and the like, or also the previously mentioned solvents, such as monoalkyl ethers of ethylene glycol and their esters, such as monomethyl, monoethyl and monopropyl ethers of ethylene glycol and their acetates, ethyl lactate, diacetone alcohol and the like.

If the vapor step of our invention is used, the otherwise required amount of solvent-water mixture to be incorporated in the coating composition may be substantially reduced. The use of this additional measure therefore makes it possible to apply coating compositions with a higher viscosity to the objects to be coated, whereby the thickness of the coating in a single application may be substantially increased. In some cases, the thickness of the coating layers which can be produced by the process of our invention and which may be applied in a single step procedure are somewhat limited by the tendency of the lacquer to run. Thus the use of the vapor step in the drying tunnel permits thicker coatings to be applied since the coating has a higher viscosity, reducing the tendency to run. A greater coating thickness of coating is desirable since it achieves an improved freedom from pores, improvement of the filler properties, improved retention of sheen by the subsequent lacquer coating, and improved resistance against moisture and chemicals.

Coatings having a greater thickness and the above described advantages may also be obtained in a single-step process by passing the objects covered with the enamel through one or more zones of elevated temperatures in accordance with another embodiment of the present invention, the temperature being, at the most, just under the boiling temperature of water.

The zones of elevated temperature may, for example, be achieved by means of radiant heaters arranged in circular fashion within the drain tunnel of a flow-coater apparatus. Most advantageously, however, these zones of high temperature are achieved by means of a stream of hot air which simultaneously promotes the evaporation of the solvent.

By using this method of operation, the excess amount of solvent which is still present in the fluid enamel and which would lead to running of the enamel, is removed from the wet film and thus achieves the adherence of a thicker enamel layer on the objects.

When certain water-soluble coating agents are used in a flow-coater under customary conditions, various difficulties appear, such as poor distribution, formation of curtains, craters and droplets and dripping.

These disadvantages are essentially caused by the solvent components of the coating composition which have a low or medium boiling point. Certain water-soluble resins which are used for the production of suitable coating agents are initially admixed with solvents having a low boiling point and with water in order to impart a permanent stability thereto. These solvents would evaporate during the coating procedure. The ratio between the binder-solvent mixture and water would thereby be disturbed or large quantities of solvents with a high boiling point would continuously have to be added in order to replace the loss of low boiling point solvents. In accordance with the present invention this loss of low boiling point solvents may be replaced prior to the coating procedure by high boiling point solvents which assure a sufficient stability of the resin in the coating agent over the entire duration of the working process. It has been found that these disadvantages can be avoided and, at the same time, a number of other advantages can be achieved when, according to a further embodiment of the invention, by displacing the solvent components of the enamal which have a low or medium boiling point by solvents which have a higher boiling point.

The displacement of these components may, for example, be achieved by adding to the enamel a mixture of a difficultly volatilizable solvent with water and spraying the two together, particularly in the flow-coater chamber. The non-vaporized, difficultly voltalizable components of the enamel and of the dilution agent are again fed into the enamel.

If the procedure of this embodiment is carried out at room temperature, the displacement of the components having a low and medium boiling point often requires an undesirably long period of time. In accordance with a further embodiment of the invention, this time requirement can be significantly reduced by operating at an elevated temperature. It is advantageous to select the temperature in such a way that a polymerization of the resin does not occur.

While we have set forth a specific embodiment and preferred mode of practice of our invention, it will be understood that this is solely to illustrate the invention and enable persons skilled in the art to better understand and practice the invention. Various changes and modifications may be made in the invention without departing from the spirit of the disclosure and the scope of the appended claims.

We claim:

1. A process for coating objects with a water-dilutable coating agent comprising a binder, water and an organic solvent in a flow-coater apparatus by spraying said objects and thereafter drying, wherein the quantitative ratio of binder to solvent to water in said coating agent is maintained substantially constant throughout the process by measuring a characteristic constant of the coating agent and adding sufficient water and solvent to maintain the solids content of said coating agent substantially constant.

2. The process of claim 1 wherein the viscosity of the coating agent is maintained substantially constant.

3. A process for coating objects with a water-dilutable coating agent comprising a binder, water and an organic solvent in a flow-coater apparatus by spraying said objects and thereafter drying, wherein the coating agent is heated to a temperature higher than that in the flow-coater and the quantitative ratio of binder to solvent to water in said coating agent is maintained substantially constant throughout the process by measuring a characteristic constant of the coating agent and adding sufficient water and solvent to maintain the solids content and the viscosity of said coating agent substantially constant.

4. The process of claim 3 wherein the coating agent is heated to a temperature of about 40° C.

5. A process for coating objects with a water-dilutable coating agent comprising a binder, water and an organic solvent in a flow-coater apparatus by spraying said objects and thereafter drying, wherein the quantitative ratio of binder to solvent to water in said coating agent is maintained substantially constant thoroughout the process by adding additional water and solvent in sufficient amount to replace the water and solvent lost during spraying, thereby maintaining the solids content and viscosity of the coating agent substantially constant, in which the amount of solvent added is not greater than the amount of water added.

6. A process for coating objects with a water-dilutable coating agent comprising a binder, water and a high boiling point organic solvent in a flow-coater apparatus by spraying said objects and thereafter drying, wherein the quantitative ratio of binder to solvent to water in said coating agent is maintained substantially constant throughout the process by adding additional water in sufficient amount to replace the water lost during spraying, thereby maintaining the solids content and the viscosity of said coating agent substantially constant.

7. The process of claim 6 wherein the solvent used has an evaporation coefficient of at least 8, based on ethyl ether as 1, and has at least two carbon atoms in the molecule.

8. A process for coating objects with a water-dilutable coating agent comprising a binder, water and an organic solvent in a flow-coater apparatus which comprises spraying said objects with said coating agent, exposing said object to a vapor comprising steam, and thereafter drying, wherein the quantitative ratio of binder to solvent to water in said coating agent is maintained substantially constant throughout the process by measuring a characteristic constant of the coating agent and adding sufficient water and solvent to maintain the solids content and the viscosity of said coating agent substantially constant.

9. The process of claim 8 wherein the vapor comprises steam and organic solvents.

10. A process for coating objects with a water-dilutable coating agent comprising a binder, water and an organic solvent in a flow-coater apparatus which comprises spraying said objects with said coating agent, and thereafter passing said objects through at least one zone of elevated temperature, the temperature being not greater than just below the boiling point of water, wherein the quantitative ratio of binder to solvent to water in said coating agent is maintained substantially constant throughout the process by measuring a characteristic constant of the coating agent and adding sufficient water and solvent to maintain the solids content and the viscosity of said coating agent substantially constant.

11. A process for coating objects with a water-dilutable coating agent comprising a binder, water and low and medium boiling point organic solvents in a flow-coater apparatus by spraying said objects and thereafter drying, wherein the low and medium boiling point solvents are displaced by high boiling solvents, and the quantitative ratio of binder to solvent to water in said coating agent is maintained substantially constant throughout the process by measuring a characteristic constant of the coating agent and adding sufficient water and high-boiling solvents to maintain the solids content and the viscosity of said coating agent substantially constant.

12. A process for coating objects with a water-dilutable coating agent comprising a binder, water and an organic solvent in a flow-coater apparatus comprising spraying said objects in a spray chamber, collecting and recycling the coating agent, and thereafter drying in a drying chamber, wherein the quantitative ratio of binder to solvent to water in said coating agent is maintained substantially constant throughout the process by measuring a characteristic constant of the coating agent and adding sufficient water and solvent to maintain the solids content and the viscosity of said coating agent substantially constant.

13. A process for coating objects with a water-dilutable coating agent comprising a binder and a diluting agent comprising water and a solvent in a flow-coater apparatus by spraying said objects and thereafter drying, wherein the quantitative ratio of binder to solvent to water in said coating agent is maintained substantially constant throughout the process by continuously measuring the ratio and continuously adding diluting agent to replace the amount lost during spraying, thereby maintaining the solids content and the viscosity of said coating agent substantially constant.

14. A process for coating objects with a water-dilutable coating agent comprising a binder, water and a solvent in a flow-coater apparatus by spraying said objects and thereafter drying, wherein the quantitative ratio of binder to solvent to water in said coating agent is maintained substantially constant throughout the process by adding water through a conduit to said coating and adding solvent to said conduit, thereby maintaining the solids content and the viscosity of said coating agent substantially constant.

15. A process for coating objects with a water-dilutable coating agent comprising a binder, water and a solvent in a flow-coater apparatus by spraying said objects and thereafter drying, wherein the quantitative ratio of binder to solvent to water in said coating agent is maintained substantially constant throughout the process by continuously measuring the ratio, continuously adding water from a conduit in accordance with the change in said ratio, and adding solvent to said conduit in accordance with the rate of flow of water, thereby maintaining the solids content and the viscosity of said coating agent substantially constant.

16. A process for coating objects with a water-dilutable coating agent comprising a binder, water and a solvent in a flow-coater apparatus by spraying said objects, drying said objects and thereafter blowing said objects with a compressed inert gas prior to baking, wherein the quantitative ratio of binder to solvent to water in said coating agent is maintained substantially constant throughout the process by measuring a characteristic constant of the coating agent and adding sufficient water and solvent to maintain the solids content and the viscosity of said coating agent substantially constant.

References Cited in the file of this patent
UNITED STATES PATENTS

| | | |
|---|---|---|
| 1,664,839 | Wermine | Apr. 3, 1928 |
| 1,790,501 | Fox | Jan. 27, 1931 |
| 2,279,686 | Kerlin | Apr. 14, 1942 |
| 2,319,852 | Doolittle | May 25, 1943 |
| 2,465,284 | Schmidt et al. | Mar. 22, 1949 |
| 2,661,310 | Page et al. | Dec. 1, 1953 |
| 2,701,544 | Lantz | Feb. 8, 1955 |
| 2,723,206 | Falk | Nov. 8, 1955 |
| 2,879,180 | Page et al. | Mar. 24, 1959 |